United States Patent Office 3,085,945
Patented Apr. 16, 1963

3,085,945
MALTING PROCESS
Wayne W. Luchsinger, Wauwatosa, and John G. Fleckenstein, Brookfield, Wis., assignors to Kurth Malting Company, Milwaukee, Wis., a corporation of Wisconsin
No Drawing. Filed June 27, 1960, Ser. No. 38,714
20 Claims. (Cl. 195—70)

This invention relates to malt and processes of producing malt. More particularly, this invention is concerned with a novel malting process which gives improved recoveries, or yields, of malt.

It is well known that cereal grains such as barley, rye, oats and wheat can be germinated, i.e., malted, to modify the kernel structure, composition and enzyme content. The resulting malts have many important uses in foods for animals and humans. Most important of all, however, is malted barley which is a basic material used in the brewing and distilling industries.

The production of malt from barley can be considered as consisting of four main steps.

The first step is to store the barley. Freshly harvested barley does not germinate well and after harvest must go through a period of rest and "sweating" before reaching good germinating energy and capacity. The "sweating" in the resting stage is caused mostly by the breathing of the kernels, which give off water vapor and carbon dioxide. Usually, from about 30 to 60 days' storage time is sufficient to condition the barley kernel for germination.

The second main step is to "steep" the barley kernels by immersing them in a tank of water, which may or may not be aerated. During the steeping process, respiration of the kernels becomes noticeable and heat and gases are given off although no significant growth takes place during steeping. The barley kernels are usually left soaking or "steeping" for from two to three days in water at a temperature from about 50–65° F. so as to ensure penetration of water into the barley grain itself and generally until a moisture content of approximately 35–45% is reached. This is usually done in several stages and advisably designated as first, second and third steeps. When the steeping is completed the white tips of the barely rootlets should not be more than just appearing ("chitting").

The third main step is the germination of the barley kernels. Germination can be accomplished in a number of ways but it broadly involves removing the barley grain from the steeping tank and subjecting it to appropriate conditions of temperature, moisture and oxygen supply for a time sufficient for the interior portion of the barley kernel (the endosperm mass) to be made porous and growth facilitated. This is frequently accomplished in compartments where the barley is spread out in beds of various sizes. During germination the respiration and growing process is accelerated. Growth starts slowly at the embryo end of the kernel the first day, the growth being accelerated the second day, which is usually when additional water is given to the germinating grain. The barley kernel begins to "chit" at the base of the kernel by showing a white tip. Rootlets then grow outwardly away from the tip. The "acrospire" also starts from the base of the kernel and grows under the hull toward the top end of the kernel. The speed of growth may slow down during the fourth day. During the rapid growth stage, the kernels give off considerable heat and carbon dioxide. Usually heat and carbon dioxide are continually taken from the grain by temperature controlled and humidified air currents. The temperature of the air entering the germinating compartment usually approximates 52–60° F. in order to maintain the temperature of the germinating grains between 60–70° F. When the acrospire has grown from three-quarters to the full length of the kernel in the great mass of the kernels, it generally indicates that the enzymes and enzymatic system of the barley have been developed and conditioned so that, when the malt is subsequently ground and treated with water at suitable temperatures, the barley malt will function to efficiently convert (a) starches to dextrins and sugars and (b) insoluble proteins to soluble proteins during mashing operations in a brewery or distillery, and (c) provide a source of desirable taste and aroma which carries through into the finished product, such as beer.

In the fourth step, when the germination has proceeded to the desired extent, the batch of malt is scooped from the germinating compartments and conveyed to the drying or kiln compartments where heated air is passed through the malt to reduce its moisture content and to stop further growth. Finally, the dried malt is removed from the kiln compartments, cleaned and stored. Cleaning usually removes the rootlets, loose hulls and broken kernels.

The barley malt differs from the barley grain in a number of respects. It contains less moisture, and is therefore more suitable for storing and grinding. Also the endosperm has been modified and is mellow compared to the hard endosperm of the original barley kernel and the enzymatic values of the malt are greatly increased compared to those of the original barley grain. The barley malt now has flavor and aroma and is readily extracted and converted. Similar conversions take place in the malting of other cereal grains or legumes.

The efficiency of the malting process is evaluated normally by reference to the number of bushels of malt obtained per bushels of grain that are malted. Thus, with reference to barley, 1 bushel of barley usually will yield a maximum of about 1.18 to 1.20 bushels of malt in a well controlled conventional malting operation. If the malting operation could be made completely efficient, a yield of about 1.31 to 1.32 bushels of malt would be obtained per bushel of barley. Although more bushels of malt are obtained than bushels of barley started with, it must be noted that 1 bushel of barley weighs 48 pounds and 1 bushel of malt weighs 34 pounds.

Losses in the malting operation take place in each step although in varying quantities. The main losses, however, are about a 1% by weight loss of solids in steeping, a 5 to 8% loss during respiration through the formation of carbon dioxide and water and a 3 to 5% loss in weight in rootlets and loose husks. In addition to these losses, there is the normal loss in moisture due to drying. Obviously, a malting process which reduces one or more of these losses would be economically useful.

The use of gibberellic acid in the malting process has already been proposed and in fact does find use in the production of certain malts. Its use, however, is limited by the reduced recoveries of malt obtained. The increased growth induced by the growth promoting effect of gibberellic acid increases the losses due to respiration and rootlet growth and these losses are not overcome economically by a reduction in malting time or other gains.

In United States Patent No. 2,698,275, issued December 28, 1954, there is described a malting process in which chitted grain (barley) is acidulated, such as with sulfuric acid, and then treated with a plant growth inhibiting hormone. The process is reported to lower losses due to respiration and rootlet growth without reducing the malt extract. The resulting loses, however, are still apparently high and appear to amount to from about 70% to almost 90% of the control losses.

According to the present invention there is provided a novel malting process which gives greatly increased malt recoveries and with other benefits which will be disclosed hereinafter. There is also provided a novel malt produced having substantially retarded, and/or essentially free of rootlets. This novel malting process broadly comprises acidulating a cereal grain, as well as contacting the cereal grain with a growth-stimulating amount of gibberellic acid, in the period from initial steeping to the growth or germination stage prior to any significant growth or germination, viz, usually within about 6 hours, and as much as 1 day, or slightly longer, after steep out, and thereafter completing the germination.

By "acidulating" is meant applying an acidic substance to the grain, such as by spraying or immersing the grain in an aqueous solution of the acidic substance to inhibit growth. Thus, the acidic substance can be incorporated in the steep water at any stage of the steeping operation or it can be applied to the grain at steep out or thereafter and before any significant growth or germination has resulted, viz, within about 6 hours and as much as 1 day or slightly longer after steep out. However, malt recoveries are generally progressively lowered as the acidulation treatment is delayed after steep out. Nevertheless, the malt recoveries generally obtained after such tardy or deferred acidulation are higher than without such treatment.

Acidulation without the adition of gibberellic acid to the grain inhibits growth but the grain is not converted to usable malt, especially at low pH values below 3.8. Gibberellic acid alone without acidulation promotes growth but losses due to respiration and rootlets are excessive.

Surprisingly, the combination of acidulation and gibberellic acid greatly inhibits respiration and practically totally inhibits rootlet growth while simultaneously stimulating hydrolytic enzyme systems which convert the grain into malt. This can be best seen by reference to Table A which gives loss data for a typical commercial malt, an experimental untreated control malt, a malt made with a combination of acidulation and gibberellic acid treatment, and a barely which has been steeped and kilned without germination.

untreated malt and, in fact, almost reaches the ultimate object of going from grain to malt without loss. The 1% loss in the acidulated-gibberellic acid treated malt due to steeping and abrasion is presently considered unavoidable but negligible compared to the reduction in other losses.

The avoidance of wasteful rootlet formation in the process of this invention is particularly significant since the germinating grain (barley) is more readily stirred and because matting is avoided. The barley thus requires less volume during germination so that more barley can be malted with existing equipment than when rootlet growth takes place. For example, instead of germinating 2500 bushels in a bed, from 3500 to 4000 bushels can be germinated. The increased productive capacity leads to lower costs. Furthermore, the essentially rootlet-free malt produced according to this invention requires much less storage volume and transportation space than conventional malt with rootlets. In addition, this malt has a higher bushel weight than conventional malt after the rootlets are removed.

The reduction in loss due to respiration is also highly important, not only because of the waste of the kernel constituents which is avoided, but also because of the reduced amount of heat developed in respiration. This heat must be removed to maintain the grain at a proper malting temperature. Since less heat is evolved there is less to remove. Turning of the malt to avoid overheating thus can be reduced. There is also less expense involved in refrigeration since less cool air is needed to maintain the malting temperature.

Malts produced using the combination of acidulation and gibberellic acid generally have a 3 to 5% higher laboratory extract content compared to control malts from the same barleys. This is an important economic gain since the extract represents fermentable sugars of value in the brewing process.

These malts also have husks which are more tightly held than malts produced conventionally. They thus can be handled without as much damage or loss as conventional malts.

Grain treated according to this invention can be germinated at a lower moisture content, such as about 43% as compared to conventional processes where the moisture content is maintained at about 45.0%. As a result, there is less moisture to be removed during drying. This also lowers the production cost.

Acidulating of the grain can be effected with a wide variety of acidic substances although the strong to moderately strong inorganic and organic acids are advisably employed including the mineral acids such as sulfuric acid, nitric acid, hydrochloric acid, perchloric acid and

TABLE A

| | Barley 11% moisture, gms. | Malt 4% moisture, gms. | Losses (gms.) | | | | Recovery ratio bu./ bu. malt to barley |
| --- | --- | --- | --- | --- | --- | --- | --- |
| | | | Moisture | Steeping and abrasion | Rootlets | Respiration | |
| Typical commercial malting | 100 | 85.0 | 7.6 | 1.0 | 2.4 | 4.0 | 1.29 |
| Experimental untreated malting | 100 | 82.8 | 7.7 | 1.0 | 3.2 | 5.3 | 1.17 |
| Experimental acidulated and gibberellic treated malting | 100 | 90.4 | 7.4 | 1.0 | 0 | 1.2 | 1.28 |
| Barley steeped and kilned without germination to 4% moisture | 100 | 91.7 | 7.3 | 1.0 | 0 | Trace | 1.29 |

The data in Table A show that the losses in the malting process of this invention in which acidulation and gibberellic acid are employed are very close to those obtained when barley is steeped and kilned without germination or conversion to malt. The data, furthermore, show that the malt produced by this invention has much less loss by respiration and rootlets than the commercial malt or phosphoric acid and monocarboxylic acids such as acetic acid, monochloroacetic acid, trichloroacetic acid and lactic acid. In addition, acidulation can be achieved with acid salts such as sodium or potassium acid sulphate, diacidphosphate and superphosphate.

Very small amounts of acid or an acid salt are needed to acidulate the grain. In effecting acidulation in the steeping stage sufficient acid or an acid salt is advisably incorporated in the steep water to bring the pH below 4 and particularly in the pH range of 1 to 3. Conventional steeping gives a pH of about 6.3 or higher. Acidulation in the first steeping requires a higher acidity than in the second steeping which in turn requires a higher acidity than in the third steeping, if there is one. This is believed due to the acid diluting and extracting ability of the nonacid containing steepings which follow the acidulation which lower the amount of acid held by the grain kernels.

By applying the acid or acid salt in aqueous solution to the grain at steep out, or shortly thereafter but before significant germination results, acidulation can be achieved with considerably less acid or acid salt than during steeping. This is because all of the acid is applied directly to the grain and is held by it and essentially none is lost through drainage.

Laboratory determination of the quantity of acidic substance (acid or acid salt but not including gibberellic acid) needed to effect acidulation of the grain is as follows: Measure the amount of acidic substance which is bound or held by a 50 g. sample of acidulated green malt germinated for one day upon mixing with 50 ml. of water and standing for one hour. In the practice of this invention this gives a solution with a pH below 6, advisably below 5 and desirably below 3.8 and between 2.0 and 3.8. The following procedure can be followed to make this determination:

Barley is malted according to the experimental malting procedure described in Example 1 infra. One day after the beginning of the germination period 50 g. of green malt is weighed into a 250 ml. beaker. The malt is covered with 50 ml. of room temperature distilled water and allowed to stand for one hour. The pH of the malt-water mixture is then determined.

The malt-water can then be filtered and 25 ml. of the filtrate titrated with 0.1 normal sodium hydroxide solution to pH 10. The difference between an untreated malt titration and the acidified malt titration can also be used as a measure of the amount of acidic substance absorbed by the malt.

The just described procedures were used on various samples of green malt prepared according to this invention and the results obtained are reported in Table B.

TABLE B

| Sample | Treatment (procedure of Example 1) | pH of steep | Green malt test, pH | Ml. $\frac{1}{10}$ N NaOH to pH 10 |
|---|---|---|---|---|
| 1 | Control | 6.78 | 6.10 | 0.60 |
| 2 | 1 p.p.m. gibberellic acid at steep out | 6.80 | 6.02 | 0.50 |
| 3 | 0.5 ml. conc. (36 N) H$_2$SO$_4$, 2nd steep | 2.00 | 3.89 | 0.85 |
| 4 | 1.0 ml. conc. (36 N) H$_2$SO$_4$, 2nd steep | 1.70 | 3.20 | 1.40 |
| 5 | 1.5 ml. conc. (36 N) H$_2$SO$_4$, 2nd steep | 1.40 | 3.10 | 1.45 |
| 6 | 1.0 ml. conc. (36 N) H$_2$SO$_4$, 2nd steep, 1 p.p.m. gibberellic acid at steep out. | 2.00 | 3.32 | 1.20 |
| 7 | 0.5 ml. conc. (36 N) H$_2$SO$_4$ at steep out. | | 2.79 | 2.15 |
| 8 | 0.75 ml. conc. (36 N) H$_2$SO$_4$ at steep out. | | 2.50 | 2.90 |
| 9 | 0.5 ml. conc. (36 N) H$_2$SO$_4$ at steep out, 1 p.p.m. gibberellic acid at steep out. | | 2.91 | 2.10 |
| 10 | 2 ml. conc. (12 N) HCl, 2nd steep, 1 p.p.m. gibberellic acid at steep out. | 1.60 | 3.61 | 1.00 |
| 11 | 1 ml. glacial acetic acid, 2nd steep, 1 p.p.m. gibberellic acid at steep out. | 4.30 | 5.69 | 0.60 |
| 12 | 1 gm. NaHSO$_4$·H$_2$O at steep out, 1 p.p.m. gibberellic acid at steep out. | | 3.95 | 0.50 |
| 13 | 2 g. NAHSO$_4$·H$_2$O at steep out, 1 p.p.m. gibberellic acid at steep out. | | 3.11 | 1.70 |
| 14 | 1 ml. 70% HClO$_4$ at steep out, 1 p.p.m. gibberellic acid at steep out. | | 3.51 | 1.25 |
| 15 | 0.5 g. ClCH$_2$COOH at steep out, 1 p.p.m. gibberellic acid at steep out. | | 4.71 | 1.00 |

In addition to gibberellic acid its growth promoting chemical equivalents and derivatives can be employed such as the alkali metal and alkaline earth metal salts thereof, alkyl esters thereof and particularly the methyl, ethyl, propyl and butyl esters, as well as acyloxy derivatives thereof such as acetyl gibberellic acid. The term "gibberellic acid" as used herein and in the claims is intended to include the free acid as well as chemical equivalents thereof.

Very small amounts of gibberellic acid are needed in the malting process of this invention. Based on the weight of the barley, from about 1 to 3 p.p.m. are entirely adequate with the use of larger amounts serving no useful or advantageous purpose. The gibberellic acid can be applied during any of the steeping stages or at steep out prior to significant germination; however, application at steep out is more effective.

The malt produced according to this invention can be used in food stuffs as well as the brewing and distilling industries.

Unless otherwise stated herein the malting process of this invention employs conventional malting techniques and conditions so that those skilled in the art can readily adapt the invention to existing equipment and operations.

This invention can be used to make malt of cereal grains including barley, rye, wheat and oats.

The following examples are presented to illustrate the invention but it is understood that the invention is not to be limited to these specific embodiments.

*Example 1*

The following experimental malting process was used to test various malting methods employing both sulfuric acid and gibberellic acid:

EXPERIMENTAL MALTING PROCESS 350 grams of barley was steeped a first time in 450 mls. of water at 55° F. for 7 hours. The water was drained off and the barley was couched (drained of water) for 17 hours. The barley was steeped a second time for 3 hours in an additional 450 mls. of water, after which the water was drained off and the barley couched for 2 hours.

Water necessary to bring the barley to desired moisture was added and the barley was germinated for five days under controlled conditions of aeration (300 ml. per min./sample) humidity (above 95%), temperature (60–65° F.) and agitation.

At the conclusion of the germination period, the weight of the green malt was determined and it was dried under the desired conditions of temperature (120° F. for 20 hours and then 170° F. for 4 hours) and air flow to about 4% moisture.

The total weight of the dried malt was determined and then the weight of the rootlets and clean-out was determined. The weight of the finished clean malt was calculated from these two figures.

Samples of barley (kindred variety) were malted according to the experimental method of malting described above. A sample was run as an untreated control. Other barley samples were steeped the first time in water containing various amounts of concentrated sulfuric acid. Still other barley samples were steeped the first time in water containing various amounts of concentrated sulphuric acid but these samples were also treated with gibberellic acid in the first steep, the second steep, or at steep out. Other relevant data and the results are shown in Table 1 following.

TABLE 1

| Run No. | Milliliters of concentrated sulfuric acid in first steep | Gibberellic acid per weight of barley | Increase in recovery due to inhibition of respiration in grams [1] | Increase in recovery due to inhibition of rootlet growth in grams [2] | Total increase in malt recovery in grams [3] | Alpha-amylase [4] | Alpha-amylase difference [5] | Modification index [6] |
|---|---|---|---|---|---|---|---|---|
| 186-1 | 0 | 0 | | | | 54.1 | | 24 |
| 186-5 | 0.5 | 0 | +2.7 | +1.7 | +4.4 | 40.6 | −13.5 | 26 |
| 186-4 | 0 | 1 p.p.m., steep out | −1.2 | −1.0 | −2.2 | 77 | +22.9 | 38 |
| 186-7 | 0.5 | do | +0.7 | +0.6 | +1.3 | 77 | +22.9 | 42 |
| 196-1 | 0 | 0 | | | | 57.2 | | 27 |
| 196-16 | 1.0 | 0 | +4.0 | +10.8 | +14.8 | 18.0 | −39.2 | 23 |
| 196-2 | 2.0 | 0 | +6.5 | +14.0 | +20.5 | (7) | (7) | 18 |
| 196-12 | 0.5 | 1 p.p.m., 2nd steep | +1.2 | +2.7 | +3.9 | 47.7 | −9.5 | 32 |
| 196-13 | 1.0 | do | +2.7 | +11.1 | +13.7 | 35.6 | −21.6 | 40 |
| 196-5 | 2.0 | do | +7.2 | +15.4 | +22.6 | 33.2 | −24.0 | 45 |
| 196-14 | 4.0 | do | +10.0 | +16.1 | +26.1 | 37.9 | −19.3 | 39 |
| 196-15 | 8.0 | do | +12.6 | +15.6 | +28.2 | 33.5 | −23.7 | 31 |
| 196-4 | 2.0 | 1 p.p.m., 1st steep | +7.1 | +15.2 | +22.3 | 39.4 | −17.8 | 45 |
| 196-17 | 0 | 1 p.p.m., 2nd steep | −0.6 | +1.0 | +0.4 | 54.2 | −3.0 | 34 |
| 202-1 | 0 | 0 | | | | 46.1 | | 25 |
| 202-4 | 2.0 | 1 p.p.m., steep out | +6.9 | +12.3 | +19.2 | 46.6 | +0.5 | 38 |
| 202-6 | 2.0 | 0.5 p.p.m., steep out | +7.1 | +12.4 | +19.5 | 46.6 | +0.5 | 38 |
| 202-7 | 2.0 | 2.0 p.p.m., steep out | +6.7 | +12.4 | +19.1 | 54.1 | +8.0 | 42 |
| 202-2 | 0 | 1 p.p.m., 2nd steep | +1.1 | +0.3 | +1.4 | 51.4 | +5.3 | 25 |
| 202-3 | 0 | 1 p.p.m., steep out | +0.7 | +1.0 | +1.7 | 60.7 | +14.6 | 27 |

[1] The increase in recovery due to inhibition of respiration is the difference in weight between the untreated control malt and a treated malt after drying each to 4% moisture.

[2] The increase in recovery due to inhibition of rootlet growth is the difference between the weight of the rootlets and clean-out of the untreated control malt and the weight of the rootlets and clean-out of a treated malt.

[3] The total increase in malt recovery is the sum of the increases described in footnotes 1 and 2.

[4] Methods of Analysis of the American Society of Brewing Chemists, 6th Ed., page 169 (1958), American Society of Brewing Chemists, Madison 5, Wisconsin. Brewer's malt can have an alpha-amylase value of about 25 to 40, with distiller's malt having higher values.

[5] Alpha-amylase difference is the difference between the alpha-amylase value of the treated malt and the untreated malt.

[6] The modification index is a measure of the conversion of the barley, or other grain, to malt. The higher the value, the greater is the conversion into malt. Malts have modification index values of about 25 to 50 (and higher) while barley has a value less than 2. The modification index provides similar information as the wort viscosity and course-fine difference determinations.

$$\text{Modification Index} = 100 \times \frac{1}{\text{TCA viscosity}}$$

TCA viscosity is determined as follows: A 25 gm. sample of malt is finely ground (Miag Cone Mill, setting 95). A flask is heated to approximately 68° C., 25 mls. of 40% trichloroacetic acid added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20 C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

[7] Too low to determine by test procedure (i.e., <17).

*Example 2*

The procedure of Example 1 was followed except that the sulfuric acid was added in the second steep. The results are shown in Table 2 following.

TABLE 2

| Run No. | Milliliters of concentrated sulfuric acid in second steep | Gibberellic acid per weight of barley | Increase in recovery due to inhibition of respiration in grams [1] | Increase in recovery due to inhibition of rootlet growth in grams [2] | Total increase in malt recovery in grams [3] | Alpha-amylase [4] | Alpha-amylase difference [5] | Modification index [6] |
|---|---|---|---|---|---|---|---|---|
| 186-1 | 0 | 0 | | | | 54.1 | | 24 |
| 186-6 | 0.5 | 0 | +1.9 | +1.0 | +2.9 | 40.8 | −13.3 | 26 |
| 186-8 | 0.5 | 1 p.p.m., steep out | +0.7 | +0.7 | +1.4 | 75.8 | +21.7 | 43 |
| 186-4 | 0 | do | −1.2 | −1.0 | −2.2 | 77.0 | +22.9 | 38 |
| 200-1 | 0 | 0 | | | | 51.4 | | 25 |
| 200-8 | 0.5 | 0 | +3.6 | +7.7 | +10.1 | 30.2 | −21.2 | 26 |
| 200-10 | 1.0 | 0 | +5.6 | +14.3 | +19.9 | (7) | (7) | 21 |
| 200-8 | 0.5 | 1 p.p.m., 2nd steep | +0.9 | +7.7 | +8.6 | 30.2 | −21.2 | 50 |
| 200-11 | 1.0 | do | +4.8 | +14.1 | +18.9 | 25.7 | −25.7 | 50 |
| 200-13 | 1.5 | do | +8.8 | +14.1 | +22.9 | 50.1 | −1.3 | 50 |
| 200-15 | 0 | 1 p.p.m., steep out | −3.6 | −4.0 | −7.6 | 73.9 | +22.5 | 42 |
| 206-1 | 0 | 0 | | | | 42.0 | | 27 |
| 206-2 | 1.5 | 0 | +9.3 | +15.9 | +25.2 | (7) | (7) | 17 |
| 206-3 | 1.5 | 1 p.p.m., steep out | +8.4 | +16.0 | +24.4 | 23.4 | −18.6 | 54 |
| 206-4 | 1.5 | 0.5 p.p.m., steep out | +8.0 | +15.9 | +23.9 | 30.0 | −12.0 | 55 |
| 202-1 | 0 | 0 | | | | 46.1 | | 25 |
| 202-8 | 1.0 | 1 p.p.m., steep out | +8.2 | +13.1 | +21.3 | 53.4 | +7.3 | 50 |
| 202-9 | 1.0 | 2 p.p.m., steep out | +3.0 | +13.2 | +16.2 | 59.6 | +13.5 | 53 |
| 202-2 | 0 | 1 p.p.m., 2nd steep | +1.1 | +0.3 | +1.4 | 51.4 | +5.3 | 25 |
| 202-3 | 0 | 1 p.p.m., steep out | +0.7 | +1.0 | +1.7 | 60.7 | +14.6 | 27 |
| 196-1 | 0 | 0 | | | | 57.2 | | 27 |
| 196-7 | 2.0 | 1 p.p.m., 1st steep | +11.2 | +16.3 | +27.5 | 33.9 | −23.3 | 45 |
| 196-8 | 2.0 | 1 p.p.m., 2nd steep | +11.5 | +16.4 | +27.9 | 28.4 | −28.8 | 48 |
| 196-9 | 2.0 | 1 p.p.m., steep out | +13.0 | +16.3 | +29.3 | 46.6 | −10.6 | 48 |
| 196-3 | 2.0 | 0 | +11.4 | +16.3 | +27.7 | (7) | (7) | 26 |
| 196-17 | 0 | 1 p.p.m., 2nd steep | −0.6 | +1.0 | +0.4 | 54.2 | −3.0 | 34 |

See Table 1 for footnotes.

Example 3

The procedure of Example 1 was followed except that the sulfuric acid was added at steep out. The results are shown in Table 3 following.

at steep out than in the second steep which, in turn, is more effective than sulfuric acid treatment in the first steep. Thus, less sulfuric acid is needed at steep out than if it is added in the second steep and less sulfuric acid is

TABLE 3

| Run No. | Milliliters of concentrated sulfuric acid at steep out | Gibberellic acid per weight of barley | Increase in recovery due to inhibition of respiration in grams [1] | Increase in recovery due to inhibition rootlet growth in grams [2] | Total increase in malt recovery in grams [3] | Alpha-amylase [4] | Alpha-amylase difference [5] | Modification index [6] |
|---|---|---|---|---|---|---|---|---|
| 198-1 | 0 | 0 | | | | 52.6 | | 25 |
| 198-5 | 0.25 | 0 | +3.7 | +7.3 | +11.0 | 31.7 | −20.9 | 19 |
| 198-4 | 0 | 1 p.p.m., 2nd steep | −0.3 | +0.7 | +0.4 | 61.5 | +8.9 | 28 |
| 198-10 | 1.0 | 1 p.p.m., steep out | +14.5 | +15.9 | +30.4 | 32.1 | −20.5 | 36 |
| 198-7 | 1.0 | 0 | +13.1 | +15.9 | +29.0 | (7) | (7) | 13 |
| 204-1 | 0 | 0 | | | | 50 | | 22 |
| 204-11 | 0.5 | 0 | +8.9 | +14.0 | +22.9 | (7) | (7) | 19 |
| 204-22 | 0.25 | 1 p.p.m., steep out | +4.1 | +10.3 | +14.4 | 54.8 | +4.8 | 40 |
| 204-23 | 0.50 | ...do | +7.1 | +13.4 | +20.5 | 51 | +1.0 | 40 |
| 204-5 | 0 | 1 p.p.m., 2nd steep | −0.4 | −0.2 | −0.6 | 52.5 | +2.5 | 27 |
| 204-6 | 0 | 1 p.p.m., steep out | −0.8 | −1.1 | −1.9 | 50 | 0.0 | 31 |
| 190-1 | 0 | 0 | | | | 52.6 | | 22 |
| 190-22 | 0 | 0.5 p.p.m., steep out | −1.4 | 0 | −1.4 | 66.5 | +13.9 | 29 |
| 190-24 | 0 | 2.0 p.p.m., steep out | −2.6 | −1.2 | −3.8 | 77.9 | +25.3 | 39 |
| 208-1 | 0 | 0 | | | | 46.6 | | 26 |
| 208-3 | 0.5 | 0.5 p.p.m., steep out | +7.7 | +16.1 | +23.8 | 32.6 | −14.0 | 54 |

See table 1 for footnotes.

Example 4

The procedure of Example 1 was followed except that the sulfuric acid was added 1 day after germination started. The results are shown in Table 4.

needed in the second steep than when it is used in the first steep.

(6) Malt made using gibberellic acid and an acid (sulfuric acid) treatment is more highly modified than malt made without either, or neither, of these agents.

TABLE 4

| Run No. | Milliliters of concentrated sulfuric acid added one day after germination started | Gibberellic acid per weight of barley | Increase in recovery due to inhibition of respiration in grams | Increase in recovery due to inhibition of rootlet growth in grams | Total increase in malt recovery in grams | Alpha-amylase | Alpha-amylase difference | Modification index |
|---|---|---|---|---|---|---|---|---|
| 206-1 | 0 | 0 | | | | 42.0 | | 27 |
| 206-17 | 0.5 | 0.5 p.p.m., steep out | +7.1 | +16.2 | +23.3 | (1) | (1) | 48 |
| 206-18 | 0.5 | 1.0 p.p.m., steep out | +5.5 | +16.1 | +21.6 | 29.6 | −12.4 | 51 |
| 206-19 | 0.5 | 2.0 p.p.m., steep out | +3.7 | +14.2 | +17.9 | 40.7 | −1.3 | 49 |
| 206-20 | 1.0 | 1 p.p.m., steep out | +9.1 | +16.2 | +25.3 | (1) | (1) | 42 |

[1] Too low to determine by test procedure.

The data in Examples 1 to 4 establishes the following:

(1) Sulfuric acid treatment alone increases the recovery from the untreated barley but the barley is not significantly changed to malt.

(2) The addition of gibberellic acid to an acidified barley has little or no effect on the recovery obtained with sulfuric acid alone (viz., the gibberellic acid does not lower the increased recovery obtained with acid), but malt is obtained.

(3) The addition of gibberellic acid alone reduces the malt recovery from that of the untreated control.

(4) Sulfuric acid alone inhibits the formation of alpha-amylase activity but gibberellic acid counteracts this inhibition.

(5) The treatment with sulfuric acid is more effective (7) Although the alpha-amylase value for gibberellic acid-sulfuric acid treated malt is sometimes decreased from the control value, the alpha-amylase content meets all malting requirements.

(8) The application of test acid after germination has started is not as effective as at steep out or in the steeping stages.

Example 5

The experimental malting process of Example 1 was followed and various acids were tested with and without gibberellic acid in the malting process. The test acid was added in the first steep and the gibberellic acid was added in the second steep. The relevant data and results are given in Table 5.

TABLE 5

| Run No. | Test acid, 1st steep Name | Amount | Milliequivalents per 100 g. of barley | Gibberellic acid per weight of barley | Total dry malt recovery in grams | Husk and root in grams | Weight of clean malt in grams | Alpha-amylase | Modification index |
|---|---|---|---|---|---|---|---|---|---|
| 198-1 | 0 | 0 | 0 | 0 | 315.4 | 16.5 | 298.9 | 52.6 | 26 |
| 198-4 | 0 | 0 | 0 | 1 p.p.m., 2nd steep | 315.1 | 15.8 | 299.3 | 61.5 | 28 |
| 198-11 | $HNO_3$ (conc.) | 4 ml | 0.179 | 0 | 322.7 | 4.0 | 318.7 | 16.9 | 21 |
| 198-12 | $HNO_3$ (conc.) | 4 ml | 0.179 | 1 p.p.m., 2nd steep | 322.6 | 3.0 | 319.6 | 46.6 | 38 |
| 198-13 | HCl (conc.) | 6 ml | 0.20 | 0 | 323.6 | 2.4 | 321.2 | <17 | 19 |
| 198-14 | HCl (conc.) | 6 ml | 0.20 | 1 p.p.m., 2nd steep | 323.4 | 2.1 | 321.3 | 44.6 | 42 |
| 198-15 | $H_3PO_4$ (85%) | 2 ml | 0.252 | 0 | 320.0 | 7.9 | 312.1 | 26.0 | 22 |
| 198-16 | $H_3PO_4$ (85%) | 2 ml | 0.252 | 1 p.p.m., 2nd steep | 318.0 | 8.8 | 309.2 | 44.6 | 31 |
| 198-19 | $CH_3COOH$ (glacial) | 4 ml | 0.20 | 0 | 320.7 | 8.1 | 312.6 | 25.7 | 19 |
| 198-20 | $CH_3COOH$ (glacial) | 4 ml | 0.20 | 1 p.p.m., 2nd steep | 319.7 | 6.8 | 312.9 | 41.9 | 36 |
| 198-23 | $Cl_3CCOOH$ | 5 g | 0.088 | 0 | 322.3 | 1.3 | 321.0 | <17 | 18 |
| 198-24 | $Cl_3CCOOH$ | 5 g | 0.088 | 1 p.p.m., 2nd steep | 321.3 | 1.9 | 319.4 | 25.8 | 47 |
| 198-21 | $ClCH_2COOH$ | 5 g | 0.226 | 0 | 329.3 | 0.8 | 328.5 | <17 | Low |
| 198-22 | $ClCH_2COOH$ | 5 g | 0.226 | 1 p.p.m., 2nd steep | 330.0 | 0.7 | 329.3 | <17 | Low |
| 198-17 | $NaHSO_4 \cdot H_2O$ | 5 g | 0.103 | 0 | 330.2 | 0.8 | 329.4 | <17 | Low |
| 198-18 | $NaHSO_4 \cdot H_2O$ | 5 g | 0.103 | 1 p.p.m., 2nd steep | 331.9 | 0.9 | 331.0 | <17 | Low |
| 200-1 | 0 | 0 | 0 | 0 | 316.6 | 15.3 | 301.3 | 51.4 | 25 |
| 200-15 | 0 | 0 | 0 | 1 p.p.m., at steep out | 313.0 | 19.3 | 293.7 | 73.9 | 42 |
| 200-6 | $HClO_4$ (70%) | 3 ml | 0.102 | 0 | 320.3 | 6.2 | 314.0 | 20.6 | 24 |
| 200-7 | $HClO_4$ (70%) | 3 ml | 0.102 | 1 p.p.m., at steep out | 318.0 | 7.2 | 310.8 | 44.1 | 40 |

Example 6

The experimental malting process of Example 1 was followed and various acids were tested with and without gibberellic acid in the malting process. The acid was applied at steep out as was the gibberellic acid. The data and results are shown in Table 6.

Example 7

The effect of the combination of sulfuric acid and gibberellic acid in the malting process was evaluated using the experimental malting process described in Example 1. The relevant data and results are reported in Table 7.

TABLE 6

| Run No. | Test acid, at steep out Name | Amount | Milliequivalents per 100 g. of barley | Gibberellic acid per weight of barley | Total dry malt recovery in grams | Husk and root in grams | Weight of clean malt in grams | Alpha-amylase | Modification index |
|---|---|---|---|---|---|---|---|---|---|
| 210-1 | 0 | 0 | 0 | 0 | 308.0 | 15.6 | 292.4 | 49.5 | 26 |
| 210-9 | 0 | 0 | 0 | 1 p.p.m. at steep out | 306.5 | 16.2 | 290.3 | 66.5 | 34 |
| 210-10 | $HClO_4$ (70%) | 1 ml | 0.034 | 0 | 315.1 | 0.3 | 314.8 | <17 | 22 |
| 210-11 | $HClO_4$ (70%) | 1 ml | 0.034 | 1 p.p.m. at steep out | 312.6 | 0.4 | 312.2 | 40.7 | 62 |
| 210-12 | $HNO_3$ (conc.) | 1 ml | 0.0446 | 0 | 317.2 | 0.2 | 317.0 | <17 | 33 |
| 210-13 | $HNO_3$ (conc.) | 1 ml | 0.0446 | 1 p.p.m. at steep out | 315.6 | 0.5 | 315.1 | 46.1 | 53 |
| 210-16 | $H_3PO_4$ (85%) | 1 ml | 0.126 | 0 | 314.6 | 0.5 | 314.1 | <17 | 13 |
| 210-17 | $H_3PO_4$ (85%) | 1 ml | 0.126 | 1 p.p.m. at steep out | 312.9 | 0.3 | 312.6 | 58.0 | 42 |
| 210-18 | $NaHSO_4 \cdot H_2O$ | 0.5 gm | 0.0103 | 0 | 312.1 | 7.8 | 304.3 | 24.4 | 18 |
| 210-19 | $NaHSO_4 \cdot H_2O$ | 0.5 gm | 0.0103 | 1 p.p.m. at steep out | 309.3 | 11.1 | 298.2 | 60.0 | 36 |
| 210-20 | $NaHSO_4 \cdot H_2O$ | 1.0 gm | 0.0206 | do | 313.8 | 3.3 | 310.5 | 47.1 | 40 |

The data of Examples 5 and 6 establish that other moderate to strong acids besides sulfuric acid can be used in conjunction with gibberellic acid to give increased malt recovery and a more greatly modified malt than with the test acid or gibberellic acid alone or with neither of these materials.

The data shows that acidification and the addition of gibberellic acid give consistent effects between varieties but that all varieties do not have the same response to equivalent quantities of acid.

TABLE 7

| Barley variety | Milliequivalents sulfuric acid per 100 g. of barley | Gibberellic acid added per weight of barley | Total dry malt recovery in grams | Husk and root in grams | Weight of clean malt in grams | Alpha-amylase | Modification index |
|---|---|---|---|---|---|---|---|
| Kindred | 0 | 0 | 308.2 | 14.2 | 294.0 | 50.1 | 22 |
| Do | 0.206, 1st steep | 0 | 312.1 | 0.2 | 311.9 | <17 | 8 |
| Do | 0.206, 1st steep | 1 p.p.m., steep out | 314.4 | 0.6 | 313.8 | 41.0 | 46 |
| Do | do | do | 307.4 | 14.4 | 293.4 | 52.6 | 27 |
| Ollie | 0 | 0 | 311.3 | 15.0 | 296.3 | 70.0 | 30 |
| Do | 0.206, 1st steep | 0 | 317.0 | 0.7 | 316.3 | 17.8 | 32 |
| Do | do | 0 | 315.9 | 0.7 | 315.2 | 54.9 | 50 |
| Parkland | 0 | 0 | 314.3 | 14.8 | 299.5 | 67.7 | 28 |
| Do | 0.206 1st steep | 0 | 320.3 | 2.6 | 317.7 | 17.5 | 27 |
| Do | do | 1 p.p.m., steep out | 319.4 | 2.2 | 317.2 | 39.4 | 46 |
| Betzes (286 g.) | 0 | 0 | 258.9 | 3.2 | 255.7 | 17.3 | 10 |
| Betzes (300 g.) | 0.206 1st steep | 1 p.p.m., steep out | 270.4 | 2.6 | 267.8 | 37.2 | 39 |
| Kindred | 0 | 0 | 309.1 | 16.5 | 292.6 | 46.6 | 26 |
| Do | 0.055, steep out | 0 | 317.1 | 0.2 | 316.9 | <17 | 19 |
| Do | do | 1 p.p.m., steep out | 316.8 | 0.4 | 316.4 | 32.6 | 54 |
| Do | do | do | 307.4 | 15.3 | 292.1 | 50.1 | 31 |
| Vantage | 0 | 0 | 310.4 | 13.3 | 297.1 | 33.0 | 19 |
| Do | 0.055, steep out | 0 | 317.3 | 0.6 | 316.7 | <17 | 15 |
| Do | do | 1 p.p.m., steep out | 315.4 | 1.1 | 314.3 | 28.1 | 44 |
| Husky | 0 | 0 | 305.6 | 15.9 | 289.7 | 84.3 | 17 |
| Do | 0.055, steep out | 0 | 313.8 | 0.3 | 313.5 | <17 | <15 |
| Do | do | 1 p.p.m., steep out | 311.4 | 0.5 | 310.9 | 18.9 | 44 |
| Tregal | 0 | 0 | 313.2 | 16.3 | 296.9 | 24.7 | 13 |
| Do | 0.055, steep out | 0 | 322.8 | 0.6 | 322.2 | <17 | <15 |
| Do | do | 1 p.p.m., steep out | 321.2 | 0.4 | 320.8 | 18.3 | 37 |

Example 8

The effect of the combination of sulfuric acid and gibberellic acid in the malting of rye, oats and wheat was evaluated using the experimental malting process described in Example 1. The relevant data and results are reported in Table 8.

TABLE 8

Treatments:
(1) Control malt
(2) 2 ml. conc. $H_2SO_4$ added in first steep
(3) 2 ml. conc. $H_2SO_4$ added in first steep, 1 p.p.m. gibberellin added at steep out
(4) 1 p.p.m. gibberellin added at steep out

| Grain | Run No. | Treatment | Malt recovery from 350 g. original grain, grams |
|---|---|---|---|
| Rye | 222-17 | 1 | 303.8 |
| Rye | 222-18 | 2 | 327.4 |
| Rye | 222-19 | 3 | 329.0 |
| Rye | 222-20 | 4 | 301.2 |
| Oats | 222-21 | 1 | 314.9 |
| Oats | 222-22 | 2 | 331.1 |
| Oats | 222-23 | 3 | 330.9 |
| Oats | 222-24 | 4 | 313.6 |
| Wheat | 226-21 | 1 | 300.4 |
| Wheat | 226-22 | 2 | 318.9 |
| Wheat | 226-23 | 3 | 319.5 |
| Wheat | 226-24 | 4 | 296.1 |

Example 9

Experimental malt samples were prepared as in Example 1 and used in brewing experiments as follows:

Brew 1—Control malt—untreated with sulfuric acid and gibberellic acid.

Brew 2—Malt prepared using 0.206 milliequivalent of sulfuric acid per 100 gms. of barley in first steep and 1 p.p.m., based on the initial barley weight, of gibberellic acid in the second steep.

Brew 3—Malt prepared using 0.206 milliequivalent of sulfuric acid per 100 gms. of barley in second steep. 1 p.p.m. of gibberellic acid was added to part of the barley in the second steep and to another part was added 1 p.p.m. of gibberellic acid at steep out. The finished malts were composited and used in the brew.

Analyses of the resulting beer produced according to conventional techniques are reported in Table 9. This data shows that the malts produced according to this invention are suitable for brewing.

TABLE 9.—BEER ANALYSIS

| Brew | Balling | pH | Color | Haze | Alcohol Percent weight | Alcohol Percent volume | Real extract | Original gravity calc. |
|---|---|---|---|---|---|---|---|---|
| 1 | 2.97 | 4.85 | 3.7 | 60 | 3.40 | 4.27 | 4.60 | 11.40 |
| 2 | 4.03 | 4.50 | 5.0 | 12 | 3.84 | 4.82 | 5.79 | 13.47 |
| 3 | 4.20 | 4.40 | 6.5 | 12 | 3.83 | 4.81 | 5.96 | 13.62 |

Various changes and modifications of the invention can be made and, to the extent that such variations incorporate the spirit of this invention, they are intended to be included within the scope of the appended claims.

What is claimed is:

1. The process of malting which comprises both acidulating and adding a growth promoting amount of gibberellic acid to a cereal grain in the period from initial steeping of the grain to before significant germination of the steeped grain begins, said acidulating being sufficiently extensive in itself to inhibit rootlet growth and modification of the cereal grain apart from the use of gibberellic acid, germinating the grain until it is modified to malt, and drying the resulting green malt.

2. The process of malting which comprises both acidulating and adding a growth promoting amount of gibberellic acid to barley in the period from initial steeping of the barley to before significant germination of the steeped barley begins, said acidulating being sufficiently extensive in itself to inhibit rootlet growth and modification of the barley apart from the use of gibberellic acid, germinating the barley until it is modified to malt, and drying the resulting green malt.

3. The process of malting which comprises both acidulating and adding a growth promoting amount of gibberellic acid to a steeping cereal grain, said acidulating being sufficiently extensive in itself to inhibit rootlet growth and modification of the cereal grain apart from the use of gibberellic acid, germinating the grain until it is modified to malt, and drying the resulting green malt.

4. The process of malting which comprises both acidulating and adding a growth promoting amount of gibberellic acid to a cereal grain between steep out and significant germination of the steeped grain, said acidulating being sufficiently extensive in itself to inhibit rootlet growth and modification of the cereal grain apart from the use of gibberellic acid, germinating the grain until it is modified to malt, and drying the resulting green malt.

5. The process of malting which comprises acidulating a cereal grain in the period from initial steeping of the grain to shortly before significant germination of the steeped grain begins, said acidulating being sufficiently extensive in itself to inhibit rootlet growth and modification of the cereal grain apart from the use of gibberellic acid, adding a growth promoting amount of gibberellic acid to the cereal grain between steep out and significant germination of the steeped grain, germinating the grain until it is modified to malt, and drying the resulting green malt.

6. The process of malting which comprises adding a growth promoting amount of gibberellic acid to a cereal grain in the period from initial steeping of the grain to before significant germination of the steeped grain begins, said acidulating being sufficiently extensive in itself to inhibit rootlet growth and modification of the cereal grain apart from the use of gibberellic acid, acidulating the cereal grain between steep out and significant germination of the steeped grain, germinating the grain until it is modified to malt, and drying the resulting green malt.

7. The process of malting which comprises both acidulating and adding a growth promoting amount of gibberellic acid to a cereal grain in the period from initial steeping of the grain to before significant germination of the steeped grain begins and germinating the grain until it is modified to malt without appreciable rootlet growth, said acidulation continuing until a 50 gm. sample of one day germinated grain added to 50 ml. of water followed by standing one hour gives a solution having an acidic pH of below 5.

8. The process of claim 7 in which the grain is barley and acidulation is effected with a member of the group consisting of mineral acids and acid salts thereof.

9. The process of claim 7 in which acidulation is effected between steep out and significant germination of the steeped grain.

10. The process of claim 7 in which the gibberellic acid is added between steep out and significant germination of the steeped grain.

11. The process of malting which comprises both steeping a cereal grain in an aqueous solution of a member of the group consisting of mineral acids and acid salts thereof at a pH below 4 and adding a growth promoting amount of gibberellic acid to the cereal grain in the period from initial steeping of the grain to before significant germination of the steeped grain begins, germinating the grain until it is modified to malt without appreciable rootlet growth, and drying the resulting green malt.

12. The process of malting which comprises both acidulating barley with sulfuric acid and adding a growth promoting amount of gibberellic acid to the barley in the period from initial steeping of the barley to before significant germination of the steeped barley begins, germinating the grain until it is modified to malt without appreciable rootlet growth, and drying the resulting green malt, said sulfuric acid being used in an amount such that a 50 gm. sample of one day germinated barley added to 50 ml. of water followed by standing one hour gives a solution having a pH of about 2.5 to 4.

13. The process of claim 12 in which hydrochloric acid is used in place of sulfuric acid.

14. The process of claim 12 in which phosporic acid is used in place of sulfuric acid.

15. The process of claim 12 in which nitric acid is used in place of sulfuric acid.

16. The process of claim 12 in which perchloric acid is used in place of sulfuric acid.

17. Rootlet-free dried cereal grain malt from which essentially no rootlets have been removed subsequent to drying, said malt having a modification index value above about 25 and an alpha-amylase value above about 25.

18. Rootlet-free dried barley malt from which essentially no rootlets have been removed subsequent to drying, said malt having a modification index value above about 25 and an alpha-amylase value above about 25.

19. Green cereal malt essentially free of rootlets having a modification index value above about 25, and an alpha-amylase value above about 25, after being dried.

20. Green barley malt essentially free of rootlets having a modification index value above about 25, and an alpha-amylase value above about 25, after being dried.

References Cited in the file of this patent

UNITED STATES PATENTS

| 2,960,409 | Macy et al. | Nov. 15, 1960 |

FOREIGN PATENTS

| 28,884/30 | Australia | Sept. 8, 1930 |
| 208,040 | Australia | May 9, 1957 |
| 811,374 | Great Britain | Apr. 2, 1959 |

OTHER REFERENCES

Urquhart: "Note on Some Experimental Steeping Treatments of Malting Barley," J. Inst. Brew., vol. 59, 1953, pp. 56–58.

UNITED STATES PATENT OFFICE
CERTIFICATE OF CORRECTION

Patent No. 3,085,945                                            April 16, 1963

Wayne W. Luchsinger et al.

It is hereby certified that error appears in the above numbered patent requiring correction and that the said Letters Patent should read as corrected below.

Column 1, line 43, for "barely" read -- barley --; column 3, line 9, for "loses" read -- losses --; line 39, for "adition" read -- addition --; line 52, for "barely" read -- barley --; column 5, TABLE B, second column, opposite "13" in the formula, for "NA" read -- Na --; same table, same second column, opposite "15" in the formula, for "CL" read -- Cl --; columns 7 and 8, TABLE 2, in the heading to the fifth column thereof, after "inhibition" insert -- of --; columns 9 and 10, TABLE 3, in the heading to the fifth column thereof, after "inhibition" insert -- of --; column 11, line 27, after "The" insert -- test --; column 14, line 40, for "modfication" read -- modification --.

Signed and sealed this 29th day of October 1963.

(SEAL)
Attest:

ERNEST W. SWIDER                                    EDWIN L. REYNOLDS

Attesting Officer                                        Acting Commissioner of Patents